United States Patent
Du et al.

(10) Patent No.: US 6,307,884 B1
(45) Date of Patent: Oct. 23, 2001

(54) DUAL DECISION FEEDBACK EQUALIZER WITH SELECTIVE ATTENUATION TO IMPROVE CHANNEL PERFORMANCE

(75) Inventors: Ke Du; Yujie Xu, both of Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/087,168

(22) Filed: May 29, 1998

(51) Int. Cl.$^7$ ................................................. H03H 7/30
(52) U.S. Cl. ..................... 375/233; 375/229; 375/232; 375/340
(58) Field of Search .............................. 375/233, 340, 375/231, 349, 229, 353, 235, 232; 360/53, 51

(56) References Cited

U.S. PATENT DOCUMENTS

| | | |
|---|---|---|
| 4,985,902 | 1/1991 | Gurcan . |
| 5,027,369 | 6/1991 | Kuenast . |
| 5,031,194 | * 7/1991 | Crespo et al. ................... 375/233 |
| 5,430,661 | 7/1995 | Fisher et al. . |
| 5,818,654 | * 10/1998 | Raddy et al. ..................... 360/53 |
| 5,974,099 | * 10/1999 | Voorman et al. .................. 375/340 |
| 6,134,065 | * 10/2000 | Bergmans et al. ................. 360/53 |

OTHER PUBLICATIONS

Chiani, Introducing Erasures in Decision–Feedback Equalization to Reduce Error Propagation, IEEE, pp. 757–760, Jul. 1997.*

* cited by examiner

Primary Examiner—Stephen Chin
Assistant Examiner—Shuwang Liu
(74) Attorney, Agent, or Firm—Crowe & Dunlevy

(57) ABSTRACT

An apparatus and method for improving error rate performance in a communication channel utilizes a dual decision feedback equalizer (DDFE) through the application of selective attenuation. An improved DDFE comprises first and second decision feedback equalizers (DFEs) operably connected in parallel to receive a series of input signals $z_k$. The DFEs independently generate two series of decisions $â^1_k$ and $â^2_k$ in relation to peak magnitudes of the series of transmitted signals $z_k$ by filtering the series of decisions $â^1_k$ and $â^2_k$ to generate filtered outputs $(a*p)^1_k$ and $(a*p)^2_k$ based on previous decisions, and summing the filtered outputs $(a*p)^1_k$ and $(a*p)^2_k$ with the transmitted input series $z_k$ to generate two series of decision variables $ã^1_k$ and $ã^2_k$, to remove effects of intersymbol interference. The improved DDFE further comprises first and second attenuation blocks, so that when a mismatch is detected between the series of decisions $â^1_k$ and $â^2_k$, a selective attenuation gain less than one is introduced into each feedback filter loop. This results in a reallocation of some of the decision energy associated with the correct series of decisions to the erroneous series and helps the erroneous DFE to make correct decisions sooner, thereby improving the error rate performance of the channel.

11 Claims, 5 Drawing Sheets

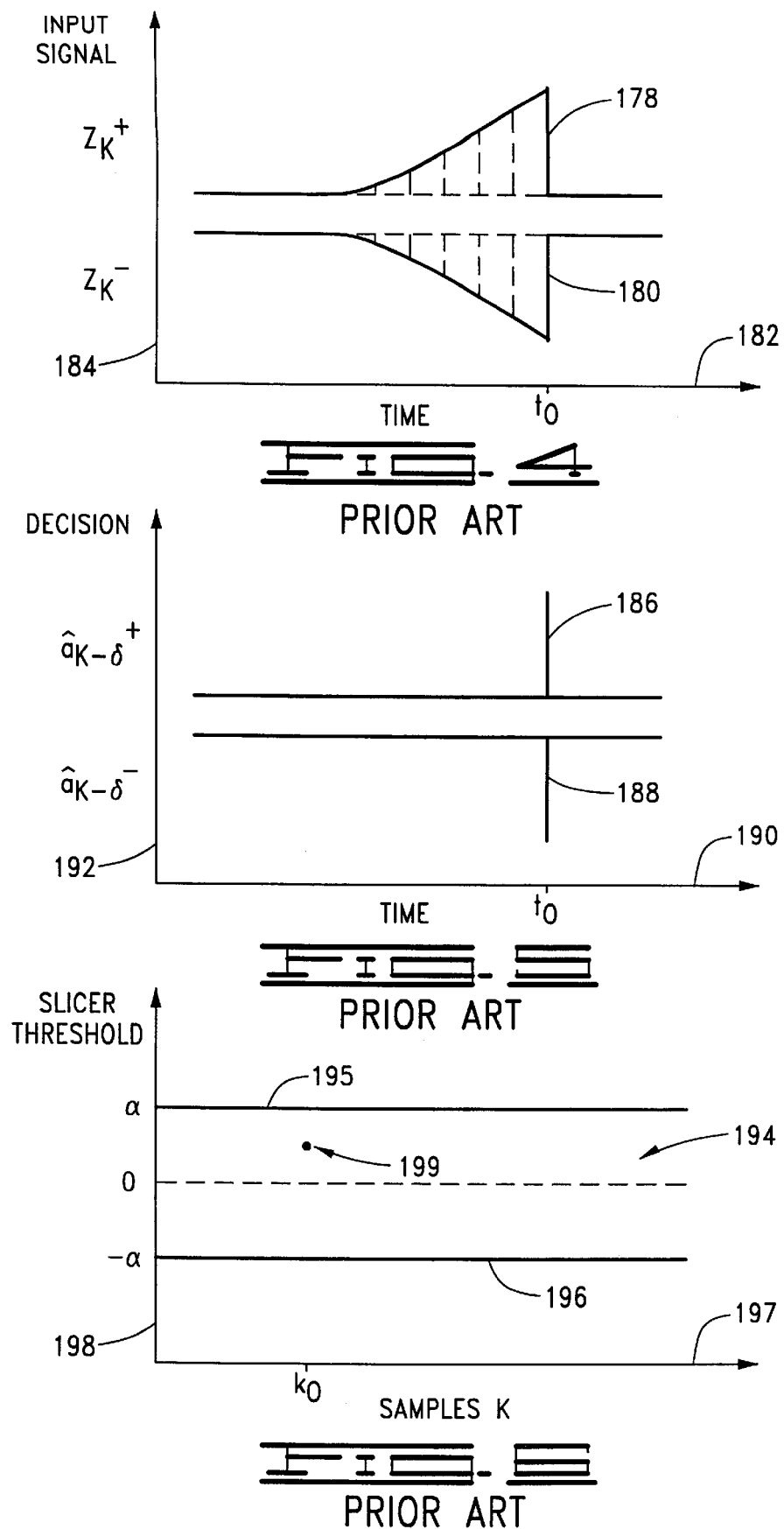

US 6,307,884 B1

DUAL DECISION FEEDBACK EQUALIZER WITH SELECTIVE ATTENUATION TO IMPROVE CHANNEL PERFORMANCE

FIELD OF THE INVENTION

This invention relates generally to the field of data communication channels, and more particularly, but not by way of limitation, to a read channel of a disc drive having an improved dual decision feedback equalizer (DDFE) that employs feedback attenuation during an erasure window to improve channel readback performance.

BACKGROUND OF THE INVENTION

Data communication channels are used to transmit and receive information in an efficient and reliable manner, Such channels are utilized in a variety of applications from wireless communication networks, such as mobile cellular and satellite communication systems, to computer data storage devices, such as hard disc drives.

In a receiving portion of a data communication channel, detection circuitry is necessary to detect and decode the information being transmitted, One basic type of detection circuitry is known as a detection feedback equalizer (DFE). As will be recognized by those skilled in the art, a typical DFE comprises a slicer which applies a selected threshold to a prefiltered input signal to generate a corresponding decision nominally indicative of the data value of the input signal (such as +1 or −1). A feedback filter having a response excited by past decisions provides an output which is subtracted from the input signal in order to cancel trailing intersymbol interference (ISI), with the resulting sum characterized as a decision variable. An error term is also generated in relation to the presence of noise in the channel as a difference between the decision variable and the decision.

In the absence of noise, the decision variable will generally be equal in magnitude to the input signal, the decision will be correct and the error term will be zero. However, as the amount of noise in the channel increases, the error term will grow; when the noise is sufficiently large, the decision variable will change polarity and an erroneous decision will be made. This erroneous decisions can propagate for some time due to the feedback provided by the feedback filter. For examples of communication channels utilizing various DFE based architectures, see U.S. Pat. No. 4,985,902 issued Jan. 15, 1991 to Gurcan, U.S. Pat. No. 5,027,369 issued Jun. 25, 1991 to Kuenast, and U.S. Pat. No. 5,430,661 issued Jul. 4, 1995 to Fisher et al.

To provide improved error rate performance over a single DFE, a dual decision feedback equalizer (DDFE) architecture was recently discussed by Bergmans et al. in a paper entitled "Dual Decision Feedback Equalizer," Philips Research Laboratories, Prof. Holstlaan 4, 5656 Eindhoven. The Netherlands, Nov. 27, 1996. In this paper, Bergmans et al, propose the use of two DFEs which are operated in parallel so that each independently makes decisions on an input sequence. The DFEs are nominally identical, except that the first DFE utilizes a slicer threshold of $\alpha$ and the second DFE utilizes a complementary slicer threshold of $-\alpha$ (the interval $-\alpha$ to $\alpha$ defining an "erasure zone").

When noise is small, the decisions of both DFEs will be correct and identical. However, when one or both of the decision variables fall within the erasure zone, the first DFE is caused to output a decision +1, the second DFE is caused to output a decision −1, and an erasure flag is set. At this point the slicer thresholds are both temporarily set to zero. The respective error terms are then accumulated for a selected amount of time during an erasure period and the DFE with less error energy is selected as the correct sequence of decisions for the period. This is based on the reasoning that the erroneous decision sequence will likely contain a larger error energy than the error energy associated with the correct decision sequence. At the conclusion of the erasure period, the slicer thresholds are reset and the DFEs resume independent operation.

A DDFE provides improved error rate performance over a DFE, approaching the higher rates of performance achievable by more complex types of detectors, such as the well-known Viterbi type. Improvements in the error rate performance of a DDFE are nonetheless desirable, especially for high data rate transfer applications such as disc drives, and it is to this end that the present invention is directed.

SUMMARY OF THE INVENTION

The present invention provides an apparatus and method for improving error rate performance of a communication channel, such as a read channel of a disc drive.

As exemplified in a preferred embodiment, the communication channel comprises a dual decision feedback equalizer with selective attenuation (DDFE/SA). The DDFE/SA comprises a first decision feedback equalizer operably coupled to receive a series of input signals $z_k$ and comprising a first slicer which utilizes a selected threshold $-\alpha$ to generate a series of decisions $â^1_k$ nominally indicative of corresponding peak data values of the series of input signals $z_k$. The first decision feedback equalizer further comprises a first feedback filter, operably coupled to receive the series of decisions $â^1_k$ from the first slicer, which provides a filtered output $(a*p)^1_k$ based on previous decisions, and a first summing junction, operably coupled to receive and sum the filtered output $(a*p)^1_k$ from the first feedback filter and the series of input signals $z_k$ to generate a series of decision variables $ã^1_k$ which are input to the first slicer.

The DDFE/SA further comprises a second decision feedback equalizer operably coupled in parallel with the first decision feedback equalizer to receive the series of input signals $z_k$ and comprising a second slicer which utilizes a selected threshold $\alpha$ to generate a series of decisions $â^2_k$ nominally indicative of corresponding peak data values of the series of input signals $z_k$, a second feedback filter, operably coupled to receive the series of decisions $â^2_k$ from the second slicer, which provides a filtered output $(a*p)^2_k$ based on previous decisions, and a second summing junction, operably coupled to receive and sum the filtered output $(a*p)^2_k$ from the second feedback filter and the series of input signals $z_k$ to generate a series of decision variables $ã^2_k$ which are input to the second slicer.

The DDFE/SA further comprises first and second attenuators, operably coupled to the first and second feedback filters, respectively, which apply the selective attenuation to the first and second feedback filters during an erasure window when a mismatch is detected between the series of decisions $â^1_k$ and $â^2_k$ (i,e., when the series of decisions are unequal). During normal operation when no mismatch is detected, the first and second attenuators apply an attenuation gain of one (i,e,, no attenuation is applied during normal operation).

Further, the DDFE/SA is provided with first and second multi-stage buffers, operably coupled to receive the series of decisions $â^1_k$ and $â^2_k$, respectively, first and second squaring blocks, operably coupled to receive and square the series of error terms $e^1_k$ and $e^2_k$, respectively, a third summing junction, operably coupled to receive and sum the squared series of error terms $e^1_k$ and $e^2_k$, respectively, and an accumulator, operably coupled to receive a summed output of the third summing junction to generate an accumulated error energy. A switch, operably coupled to the first and second multi-stage buffers and the accumulator, selects a correct series of decisions from the series of decisions $â^1_k$ and $â^2_k$ stored in the first and second multi-stage buffers, respectively, in relation to a polarity of the accumulated error energy at such time that the mismatch between the series of decisions $â^1_k$ and $â^2_k$ is resolved; that is, in relation to the series having the lower error energy.

Generally, the DFE producing the correct decision sequence will likely continue to make correct decisions, whereas the DFE producing the erroneous decision sequence will likely make additionally incorrect decisions. Thus, by attenuating the feedback filtering, some of the correct decision energy can be reallocated to compensate the erroneous decision sequence at the next decision point. This helps the erroneous DFE to make a correct decision. Once the DFEs are once again producing identical decisions, the attenuation gain is restored to one. The overall error rate performance of the channel can thus be significantly improved, since the application of the attenuation gain causes the two DFEs to make identical decisions sooner.

These and various other features as well as advantages which characterize the present invention will be apparent from a reading of the following detailed description and a review of the associated drawings.

BRIEF DESCRIPTION OF THE DRAWINGS

FIG. 4 shows a graphical representation of typical input signals provided to the DDFE of FIG. 3.

FIG. 5 shows a graphical representation of typical decisions obtained by the DDFE upon the input signals of FIG. 4.

FIG. 6 shows an erasure zone determined by thresholds utilized by slicers of the DDFE of FIG. 3.

DETAILED DESCRIPTION

Figure 1:
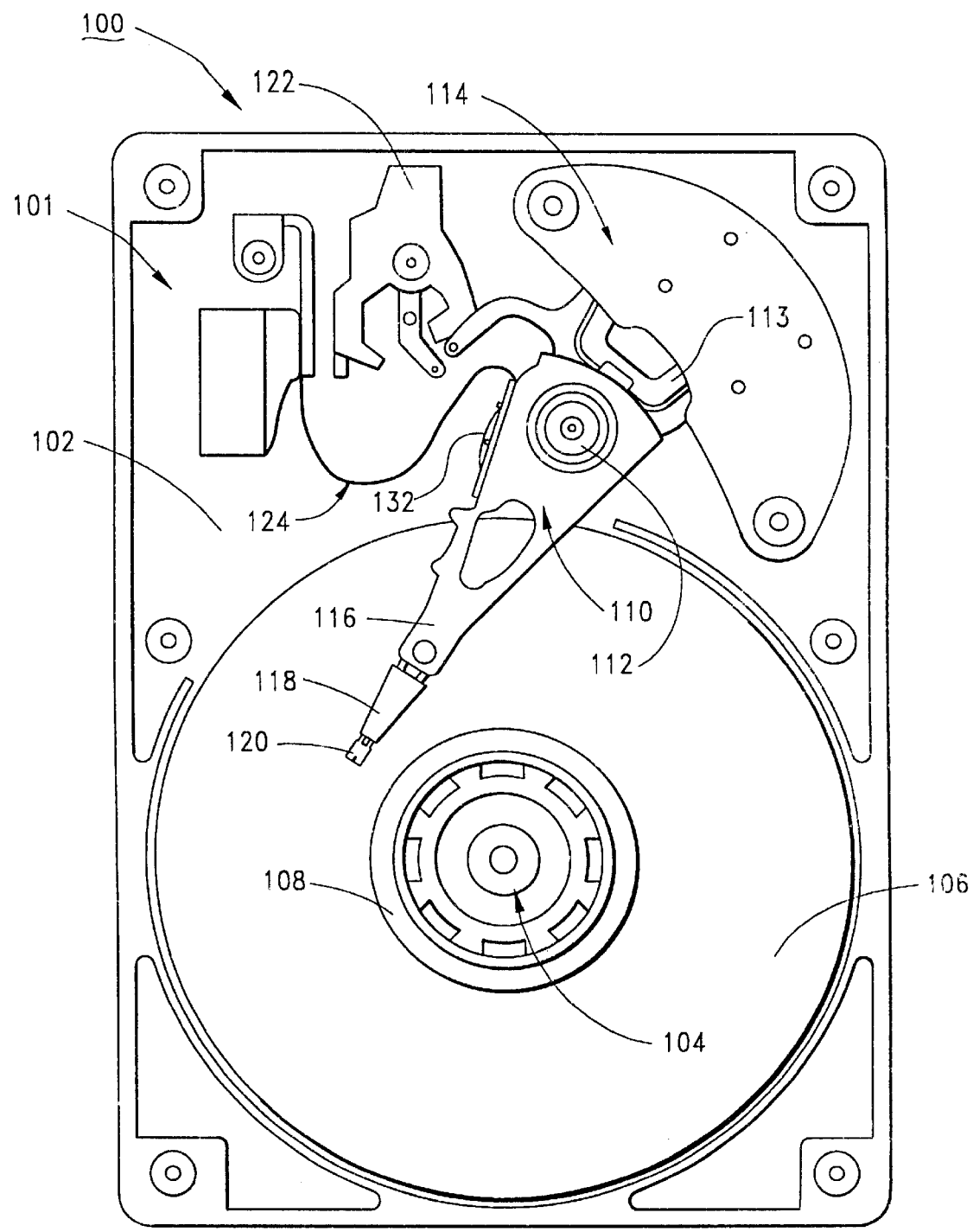
FIG. 1 shows a top plan view of a disc drive constructed in accordance with a preferred embodiment of the present invention.

In order to discuss a preferred embodiment of the present invention. FIG. 1 has been provided which shows a top plan view of a disc drive 100 used to magnetically store and retrieve computer data. The disc drive 100 includes a head-disc assembly (HDA) 101 and a printed wiring assembly (PWA) which is mounted to the underside of the HDA, and thus not visible in FIG. 1.

A top cover, omitted from FIG. 1 to reveal interior portions of the HDA 101, mates with a base deck 102 of the HDA 101 in order to provide a clean operational environment for the HDA 101. A spindle motor (generally designated at 104) is supported by the base deck 102 and rotates a plurality of discs 106 at a constant high speed. A disc clamp 108 secures the discs 106 to the spindle motor 104.

The discs 106 include recording surfaces (not separately designated) having a plurality of tracks to which user data are written by way of a rotary actuator assembly 110. The actuator assembly 110 rotates about a cartridge bearing assembly 112 in response to the application of current to a coil (113, a portion of which is visible in FIG. 1) of a voice coil motor (VCM) 114 to provide positional control of the actuator assembly.

A plurality of rigid arms 116 extend from the actuator assembly 110, each of which supports a corresponding flexible suspension assembly 118. A plurality of heads 120 are supported by the suspension assemblies 118 over the tracks of the discs 106 by an air bearing established by air currents set up by the high speed rotation of the discs 106. A latch assembly 122 secures the actuator assembly 110 when the disc drive 100 is deactivated. A flex circuit assembly 124 facilitates electrical communication between the actuator assembly 110 and the disc drive PWA.

Figure 2:
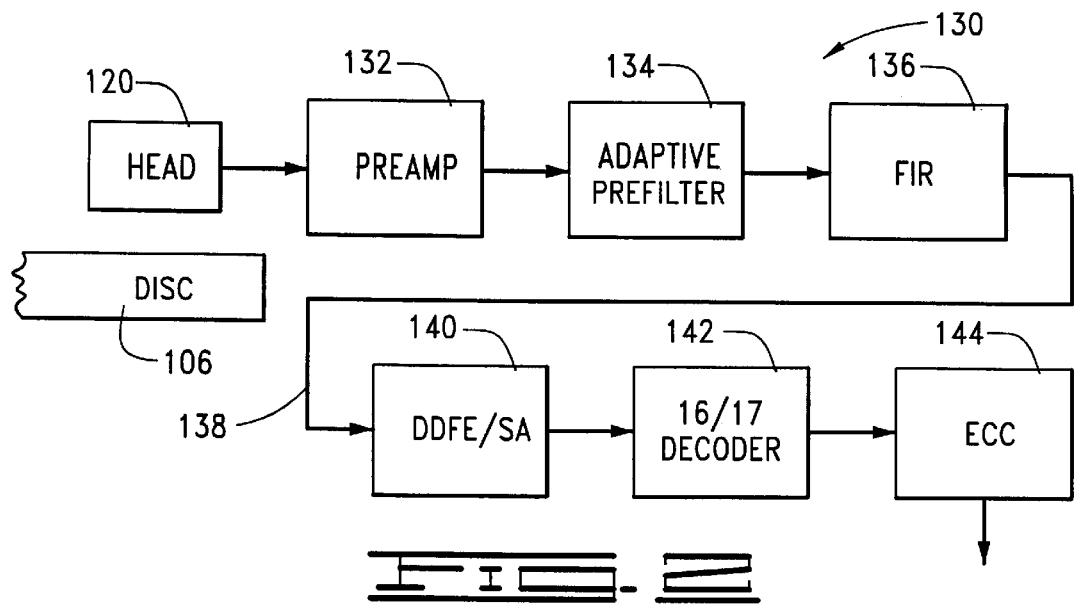
FIG. 2 provides a functional block diagram of a read channel of the disc drive of FIG. 1.

With reference now to FIG. 2, shown therein is a generalized functional block diagram of a read channel of the disc drive 100, generally denoted at 130. It will be recognized that the read channel 130 includes additional circuits that are not germane to the present discussion, and have therefore been omitted from FIG. 2 for purposes of clarity. For reference, portions of the read channel 130 are realized in electronic circuitry of the aforementioned disc drive PWA.

During a read operation in which selected data are to be recovered by the disc drive 100 and provided to a host computer (not shown) in which the disc drive 100 resides, a selected head 120 transduces the selective magnetization of a track on the corresponding disc 106 to generate readback signals that are amplified by a preamplifier circuit 132 (preamp). The preamp 132 is preferably disposed within the HDA 101, as shown in FIG. 1, so that the preamp is located as close as practicable to the heads 120.

The amplified readback signals from the preamp 132 are provided to an adaptive prefilter 134, which applies frequency-domain filtering to the amplified readback signals to remove higher frequency noise components from the signals. The frequency domain filtering characteristics of the adaptive prefilter 134 can be readily controlled through the use of control inputs provided by, for example, a system processor (not shown) on the disc drive PWA.

The filtered output of the adaptive prefilter 134 is provided to a conventional finite impulse response filter 136, also commonly referred to as a "FIR", or a "transversal equalizer." The FIR 136 provides time domain equalization of the readback signals, filtering the signals to a close approximation of a selected class of partial response, maximum likelihood (PRML) signal processing.

The output of the FIR 136 is in turn provided as a series of input signals on path 138 to a dual decision feedback equalizer with selective attenuation (DDFE/SA) 140, constructed in accordance with a preferred embodiment of the present invention. As discussed more fully below, the DDFE/SA 140 outputs a series of decisions in response to the input signals from the FIR 136.

The output decisions from the DDFE/SA 140 nominally comprises a data sequence corresponding to the encoded data originally written to the selected track. This output data sequence is provided to a 16/17 decoder 142, which converts each set of 17 bits stored to the disc 106 back to the original 16 bits of input data to remove initially applied run length limited (RLL) and error correction encoding applied by a write channel (not shown) of the disc drive 100 when the data were initially written.

Finally, the output sequence from the decoder 142 is provided to an error correction code (ECC) circuit 144, which performs error detection and correction upon the received sequence (using, for example Reed-Solomon codes) and, if no uncorrectable errors are present, outputs the recovered user data to an interface circuit (not shown) for subsequent transfer to the host computer.

As discussed in greater detail in U.S. Pat. No. 5,627,843 issued May 6, 1997 to Deng et al., assigned to the assignee of the present invention, ECC encoding is initially performed by the write channel by appending a number of code symbols to the end of each selected portion of data symbols to generate encoded words (or interleaves) that mathematically map into a Galois field. That is, the code symbols are added to the data symbols so that the total set of symbols can be considered to be the coefficients of a polynomial having defined roots, so that only mathematically defined combinations can legally exist.

When an encoded word is retrieved, the word is compared to the set of defined combinations, so that encoded words containing read errors will generally not map into the set of defined combinations; thus, based upon the algorithm used by the ECC circuitry, illegal combinations can be detected and up to a selected number of the data symbols in such words can be changed in order to correct the presence of read errors therein. Once the data has been corrected, the code bits are stripped, allowing the originally recorded data to be output by the ECC circuit 144.

Figure 3:
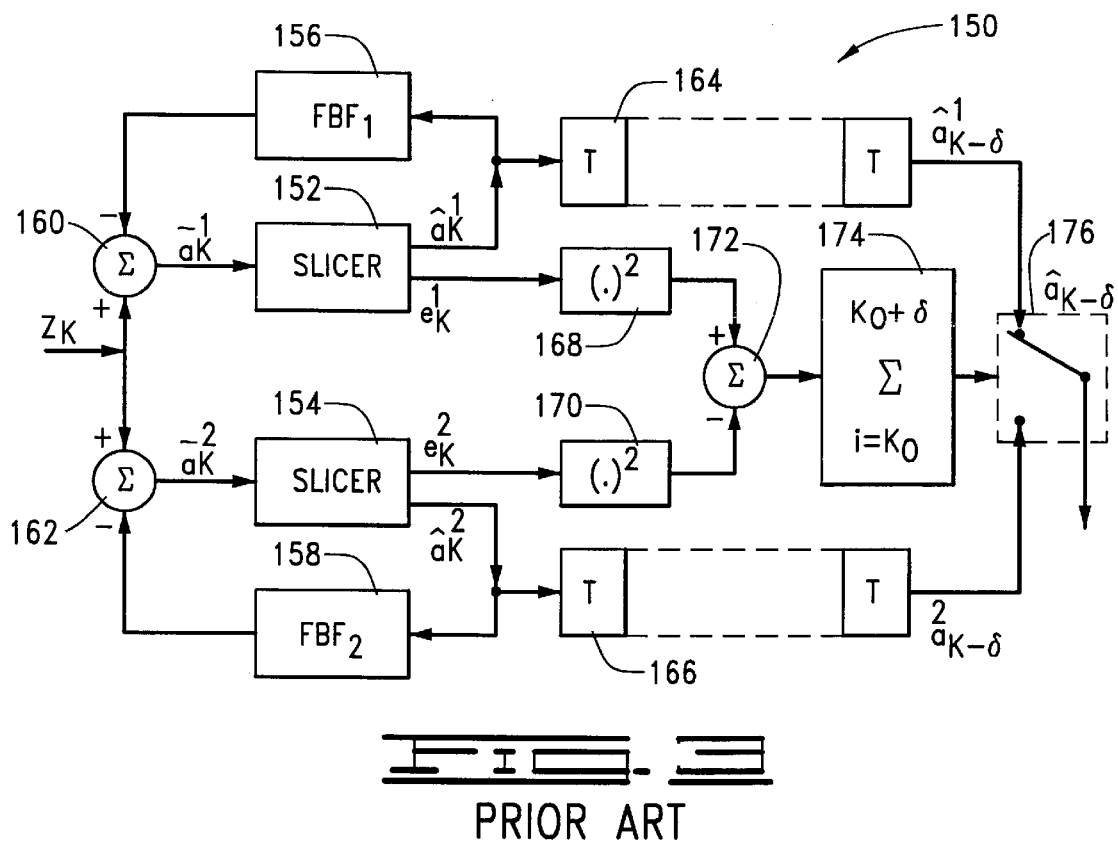
FIG. 3 provides a functional block diagram of a prior art dual decision feedback equalizer (DDFE).

Referring now to FIG. 3, shown therein is a functional block representation of a prior art dual decision feedback equalizer (DDFE) 150, constructed in accordance with the aforementioned Bergmans et al, paper, The operation of the DDFE 150 will be discussed after a brief review of the several constituent components.

As shown in FIG. 3, the DDFE 150 comprises two nominally identical DFEs respectively having first and second slicers 152, 154, feedback filters 156, 158 (FBF$_1$ and FBF$_2$), summing junctions 160, 162, multi-stage buffers 164, 166, and squaring blocks 168, 170. Also shown is a third summing junction 172, an accumulator 174 and a switch 176.

Generally, the DDFE 150 operates on a discrete time input sequence $z_k$ as follows:

$$z_k = (a*q)_k + n_k \tag{1}$$

where $a_k$ is the initially transmitted data sequence (from the disc 106), $q_k$, is the overall system response and $n_k$ is additive noise (the symbol "*" denotes linear convolution). The feedback filters 156, 158 are each nominally provided with an impulse response $p_k$ which is essentially the "tail" of the system response:

$$p_k = \begin{cases} q_k & \text{for } k \geq 1, \text{ and} \\ 0 & \text{else.} \end{cases} \tag{2}$$

The feedback filters 164, 166 are excited by past decisions and produce outputs $(\hat{a}*p)^1_k$ and $(\hat{a}*p)^2_k$ which are subtracted from the input sequence $z_k$ to cancel trailing intersymbol interference. Hence, the outputs of the summing junctions 160, 162 are decision variables $\tilde{a}^1_k$, $\tilde{a}^2_k$, which can be expressed using the following general relation:

$$\tilde{a}_k = (a*q)_k - (\hat{a}*p)_k + n_k \tag{3}$$

and error terms $e^1_k$, $e^2_k$ which can be expressed using the following general relation:

$$e_k = \tilde{a}_k - \hat{a}_k \tag{4}$$

Accordingly, during operation the slicers 152, 154 nominally apply respective thresholds of $-\alpha$ and $\alpha$ (with $\alpha$ taking a value such as 0.25) to generate the corresponding decisions $\hat{a}^1_k$, $\hat{a}^2_k$ concerning the magnitude of input signals $z_k$, as well as the error terms $e^1_k$, $e^2_k$. For reference, curves 178, 180 of FIG. 4 show positive (+1) and negative (−1) input signals $z^+_k$ and $z^-_k$, respectively, plotted against an x-axis 182 indicative of time and a y-axis 184 indicative of amplitude. It will be recognized that the curves 178, 180 are composed of a plurality of discrete points, indicated by dotted line segments as shown. Corresponding decisions, indicated by segments 186, 188 of FIG. 5, plotted against x-axis 190 and y-axis 192, are nominally indicative of the magnitude of the input signals 178, 180 at time $t_0$.

The decisions $\hat{a}^1_k$, $\hat{a}^2_k$ are fedback using the feedback filters 156, 158 and summed with the input signals $z_k$ to generate the decision variables $\tilde{a}^1_k$, $\tilde{a}^2_k$. When noise is small, then the decisions $\hat{a}^1_2$ and $\hat{a}^2_k$ will be correct and identical, However, if at some sample $k=k_0$ the decision variables $\hat{a}^1_k$ and $\hat{a}^2_k$ fall within an erasure zone defined by $(-\alpha, \alpha)$, then the slicer 152 will produce a decision $\hat{a}^1_{k0}=+1$ and the slicer 154 will produce a corresponding decision $\hat{a}^2_{k0}=-1$. This is graphically illustrated by FIG. 6, which shows an erasure zone 194 defined by thresholds 195, 196 using an x-axis 197 and a y-axis 198. From FIG. 6 it will be recognized that a selected decision variable falling within the erasure zone 194 (as indicated at point 199) will set an erasure flag (not separately shown in the drawings) and commence an erasure period of defined length. The slicer thresholds $\alpha$, $-\alpha$ are set to zero during the erasure period.

The forcing of the decisions $\hat{a}^1_{k0}$, $\hat{a}^2_{k0}$ to +1, −1 respectively ensures that both possible outcomes of the uncertain decision will be covered, so that one of the DFEs is likely to deliver a correct sequence of decisions. Because the decision sequences are provided to the respective multi-stage buffers 164, 166 (which are preferably shift registers) each with a total number of $\delta$ stages, the DDFE 150 can use up to a total of $\delta$ symbol intervals to determine which decision sequence is correct. It will be noted that the feedback filters 156, 158 are likewise preferably provided with at least a total of $\delta$ stages (taps).

During the erasure period, the energies of the error sequences $e^1_k$, $e^2_k$ are squared (by blocks 168, 170), differenced (by summing junction 172) and integrated across the erasure period (by accumulator 174). The sign of the result determines the setting of the switch 176, as the erroneous decision sequence will likely contain a larger error energy during the erasure period.

Figure 7:
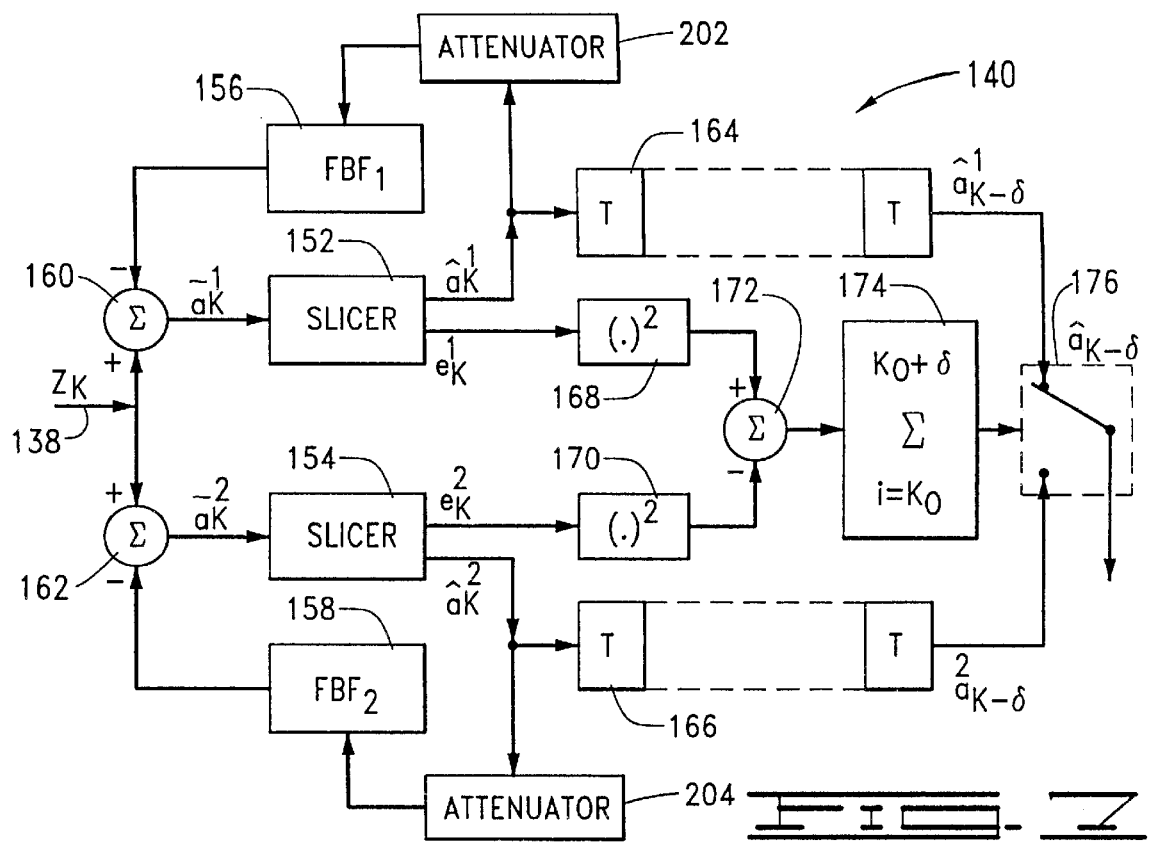
FIG. 7 provides a functional block diagram of a dual decision feedback equalizer with selective attenuation (DDFE/SA), constructed in accordance with a preferred embodiment of the present invention and incorporating the use of attenuators operably coupled to feedback filters of the DDFE/SA.

Having concluded a discussion of the prior art DDFE 150, reference is now made to FIG. 7, which shows a functional block diagram of the DDFE/SA 140 of FIG. 2, constructed in accordance with a preferred embodiment. As several components of FIG. 7 are substantially similar to those previously discussed with respect to FIG. 3, corresponding reference numerals have been shown to facilitate the present discussion.

Initially, it will be noted that one of the primary differences between the DDFE/SA 140 of FIG. 7 and the prior art DDFE 150 of FIG. 3 is the inclusion of attenuators 202, 204, which are shown in FIG. 7 to be operably connected to the feedback filters 156, 158. The attenuators 202, 204 are each constructed so as to apply a selective gain to the respective decisions $â^1_k$, $â^2_k$, preferably over a range of from zero to one (0–1). During normal operation when the decisions provided by the DDFE/SA 140 agree, the gain is preferably set to one, so that the DDFE/SA 140 nominally operates in the same manner as the DDFE 150 of FIG. 3 (i,e., no attenuation is applied during normal operation).

However, when an erasure flag is set as a result of a selected decision variable $ã^1_k$, $ã^2_k$ falling within the erasure zone (such as previously discussed at point 199 in FIG. 6), the respective decisions are forced to ±1, the slicer thresholds are reset to zero, and the gains of the attenuators 202, 204 are reduced to a selected level, such as 0.9. The DDFE/SA 140 continues operation as before by squaring, differencing and accumulating the error sequences $e^1_k$, $e^2_k$ during the resulting erasure periody. It will be noted, though, that the use of the selective attenuation of the attenuators 202, 204 reallocates some of the correct decision energy to compensate the erroneous decision sequence. That is, because the slicer 152, 154 producing the correct decision is likely to make a correct decision at the next sample, and the remaining slicer providing the erroneous decision sequence will correspondingly likely make a wrong decision at the next sample, some of the energy from the correct decision can be used to help the erroneous slicer make a correct decision sooner.

Figure 8:
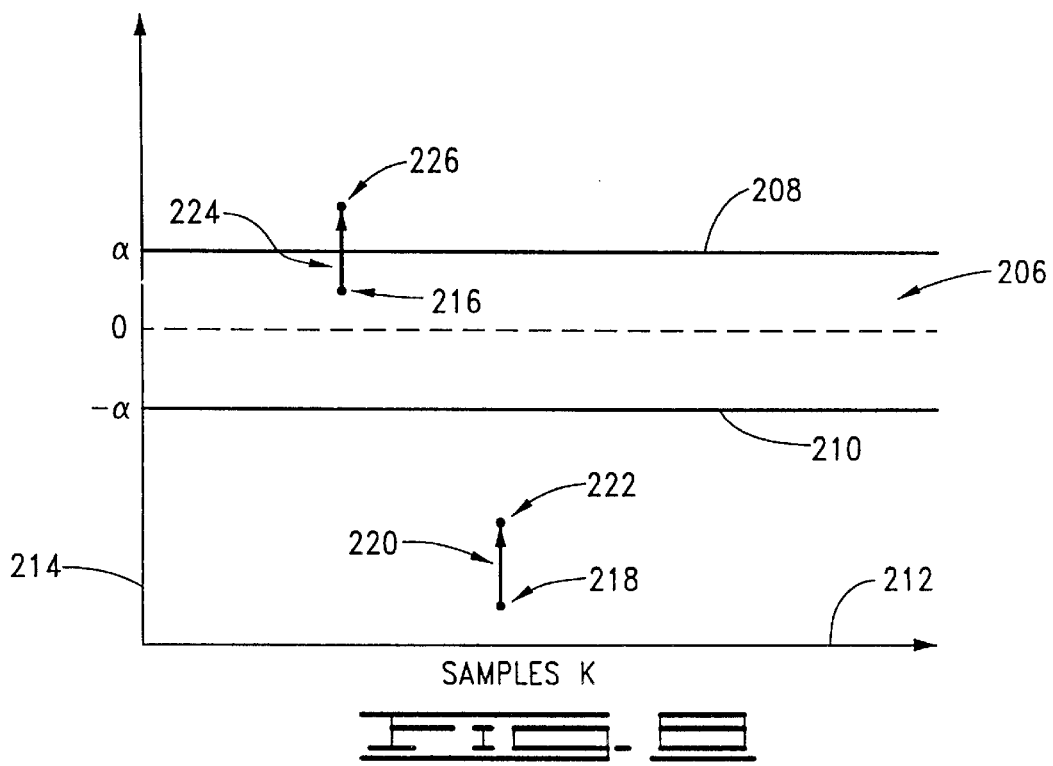
FIG. 8 provides a graphical representation of an erasure zone, similar to that of FIG. 6, and represents the manner in which energy from the correct decision sequence can be reallocated to the erroneous decision sequence to help the two DFEs of the DDFE/SA make the same decisions in a shorter amount of time as compared to the prior art DDFE of FIG. 3.

This can be conceptually understood from a review of FIG. 8, which shows a simplified graphical representation of an erasure zone 206 defined by thresholds 208, 210 (of the slicers 152, 154 of FIG. 7) and plotted against an x-axis 212 generally indicative of samples k and a y-axis 214 indicative of amplitude. For reference, it will be understood that the slicer thresholds are set to zero during the erasure period, as previously mentioned above.

When a selected decision variable (denoted at point 216) falls within the erasure zone 206, as discussed above the erasure period is commenced and the gains of attenuators 202, 204 are applied to the decisions $â^1_k$, $â^2_k$. The resulting attenuation tends to reduce the energy of the correct decisions, one of which is represented by correct decision variable at point 218, As shown in FIG. 8, the point 218 is moved by attenuation arrow 220 to attenuated point 222, which is closer to, but still well beyond the erasure zone 206. At the same time, the attenuation operates to increase the energy of the uncertain decision variable 216, as represented by attenuation arrow 224, to a new point 226 which is outside the erasure zone 206.

Hence, the transfer of energy from the correct decision sequence to the erroneous decision sequence will generally cause the two decision paths to converge to the same decisions sooner, resulting in an improved error rate performance for the channel 130. This is because the overall error rate performance of the channel 130 is largely influenced by the operation of the ECC circuit 144 (FIG. 2). Ideally, any erroneous decisions that do happen to be output by the DDFE/SA 140 will be detected by the ECC circuit 144 and, if within the error correction capabilities thereof, will be corrected on-the-fly, so that the overall performance of the channel 130 is unaffected. Because it is more likely that the correct decisions will be output by the DDFE/SA 140 at times when both of the DFEs are independently arriving at the same decisions (using the different slicer thresholds ±α), it follows that the less time that a mismatch condition exists, the greater the likelihood that the correct decisions are being made. Thus, if the DFEs can be made to converge to the same decisions sooner, the overall error rate of the channel should be correspondingly improved. Computer simulations suggest that this is in fact the case, as will be discussed below.

At this point, however, it reference will now be made to FIG. 9 which provides an ERASURE PERIOD WITH SELECTIVE ATTENUATION routine 230, illustrating the steps carried out during operation of the DDFE/SA 140 in accordance with a preferred embodiment.

As discussed above, during normal operation the DDFE/SA 140 of FIG. 7 nominally operates in a manner similar to that of the prior art DDFE 150 of FIG. 3. However, at such time that an uncertain decision variable is detected, as indicated by step 232 of FIG. 9, an erasure flag will be set and the attenuation levels of the attenuators 202, 204 (FIG. 7) will be reduced, as indicated by step 234. Preferably, as shown by step 236, the slicer thresholds α, −α are temporarily reset to zero during the resulting erasure period. It will be noted, however, that it may be desirable in some cases to reduce the slicer thresholds to some other value, or to stepwise reduce the thresholds over a number of sample periods. During the erasure period, the error energies are accumulated, step 238, by the combined operation of the squaring blocks 168, 170, the summing junction 172 and the accumulator 174.

Figure 9:
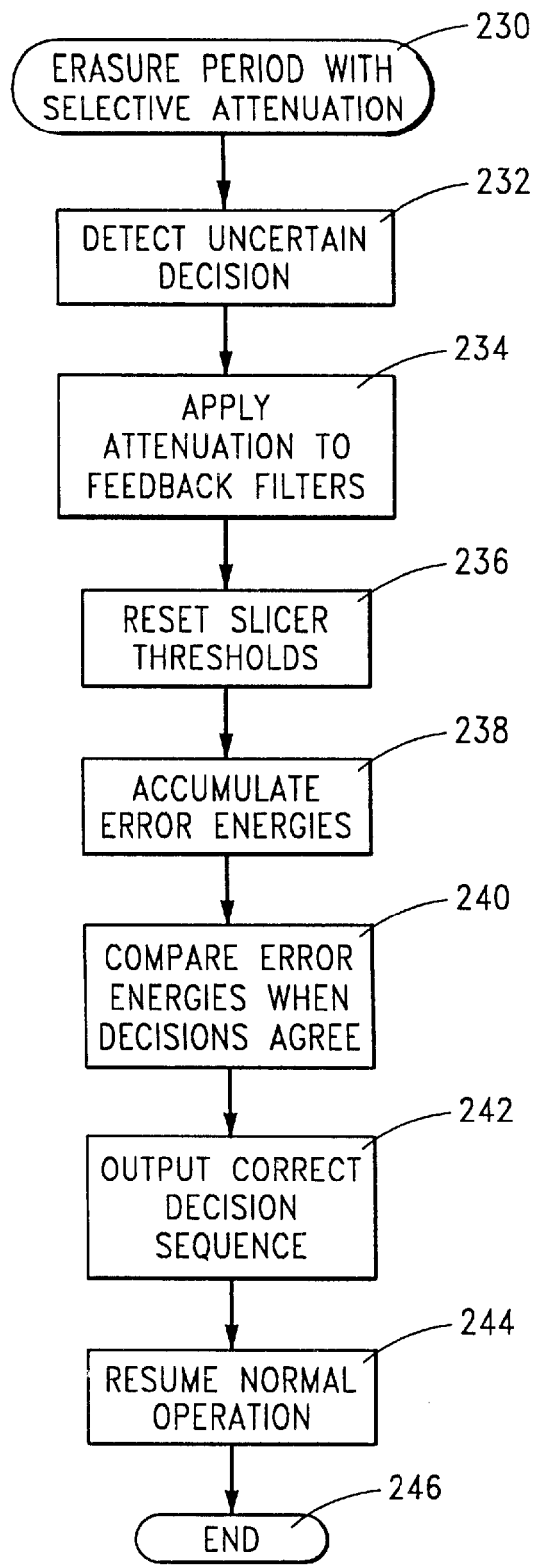
FIG. 9 provides a flow chart for an ERASURE PERIOD WITH SELECTIVE ATTENUATION routine, indicative of steps carried out by the DDFE/SA in accordance with a preferred embodiment.

The routine of FIG. 9 continuously monitors the decisions $â^1_k$, $â^2_k$ and compares the accumulated error energies at such time that the decisions agree, as indicated by step 240. Thus, although the erasure period can extend up to a total of δ samples (corresponding to the number of stages in the buffers 164, 166), the erasure period can be shortened if the DFEs begin agreeing before the δth sample. The correct decision sequence is next output based on the decision sequence having the lower error energy, step 242, after which the DDFE/SA 140 resumes normal operation at step 244, including the resetting of the gains of the attenuators 202, 204 back to one. The routine then ends at step 246.

As stated above, the reallocation of energy to the erroneous decision sequence typically results in the DFEs arriving at the same decisions sooner in time, generally resulting in an improved channel error rate, as determined by the downstream ECC circuit 144 (FIG. 2). Computer simulation results utilizing a Lorentzian channel and a channel density of 2.8 has shown a reduction in the overall number of detector errors (from 8% to 25%), as well as a reduction in the total number of burst errors (from 6% to 18%), depending upon the selected attenuation gain and desired detection signal to noise ratio (SNR). Thus, DDFE/SA 140 can advantageously provide improved performance over that available from the prior art DDFE 150, which can be particularly desirable in error rate sensitive applications such as disc drives. Of course, it will be recognized that the particular attenuation gain applied will vary depending upon the requirements of a given application, and care should be used in selecting the gain so that the slicer 152, 154 outputting the correct decisions does not inadvertently begin making wrong decisions (due to uncancelled ISI).

Finally, although in a preferred embodiment the attenuation has been shown to be provided by the attenuators 202, 204, it will be recognized that the selective attenuation can be provided in alternative ways, such as by the feedback filters 156, 158 directly, as long as the outputs of the feedback filters 156, 158 are reduced by a selected amount during the erasure period.

In view of the foregoing, it will be recognized that the present invention is directed to an apparatus and method for improving error rate performance in a communication channel, such as a read channel of a disc drive.

As exemplified in a preferred embodiment, the communication channel comprises a dual decision feedback equalizer with selective attenuation (DDFE/SA, 140). The DDFE/SA comprises a first decision feedback equalizer operably coupled to receive a series of input signals $z_k$ and comprising a first slicer (152) which utilizes a selected threshold $-\alpha$ to generate a series of decisions $â^1_k$ nominally indicative of corresponding peak data values of the series of input signals $z_k$, a first feedback filter (156), operably coupled to receive the series of decisions $â^1_k$ from the first slicer, which provides a filtered output $(a^*p)^1_k$ based on previous decisions, and a first summing junction (160), operably coupled to receive and sum the filtered output $(a^*p)^1_k$ from the first feedback filter and the series of input signals $z_k$ to generate a series of decision variables $ã^1_k$ which are input to the first slicer.

The DDFE/SA further comprises a second decision feedback equalizer operably coupled in parallel with the first decision feedback equalizer to receive the series of input signals $z_k$ and comprising a second slicer (154) which utilizes a selected threshold $\alpha$ to generate a series of decisions $â^2_k$ nominally indicative of corresponding peak data values of the series of input signals $z_k$, a second feedback filter (158), operably coupled to receive the series of decisions $â^2_k$ from the second slicer, which provides a filtered output $(a^*p)^2_k$ based on previous decisions, and a second summing junction (162), operably coupled to receive and sum the filtered output $(a^*p)^2_k$ from the second feedback filter and the series of input signals $z_k$ to generate a series of decision variables $ã^2_k$ which are input to the second slicer.

The DDFE/SA further comprises first and second attenuators (202, 204), operably coupled to the first and second feedback filters, respectively, which apply the selective attenuation to the first and second feedback filters when a mismatch is detected between the series of decisions $â^1_k$ and $â^2_k$, a mismatch being defined as discussed above as a condition wherein the decisions are not equal, due to an uncertain decision variable. During normal operation when no mismatch is detected (i,e., the decisions are equal), the first and second attenuators apply an attenuation gain of one.

Further, the DDFE/SA is provided with first and second multi-stage buffers (164, 166), operably coupled to receive the series of decisions $â^1_k$ and $â^2_k$, respectively, first and second squaring blocks (168, 170), operably coupled to receive and square the series of error terms $e^1_k$ and $e^2_k$, respectively, a third summing junction (172), operably coupled to receive and sum the squared series of error terms $e^1_k$ and $e^2_k$, respectively, and an accumulator (174), operably coupled to receive a summed output of the third summing junction to generate an accumulated error energy. A switch (176), operably coupled to the first and second multi-stage buffers and the accumulator, selects a correct series of decisions from the series of decisions $â^1_k$ and $â^2_k$ stored in the first and second multi-stage buffers, respectively, in relation to a polarity of the accumulated error energy at such time that the mismatch between the series of decisions $â^1_k$ and $â^2_k$ is resolved.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a communication channel of the type characterized as having a dual decision feedback equalizer comprising a pair of nominally independent decision feedback equalizers operably coupled in parallel to receive a series of input signals, each decision feedback equalizer comprising a slicer which applies a selected threshold to generate a series of decisions nominally indicative of peak data values of the series of input signals and a feedback filter having a response excited by previous decisions which provides a filtered output which is subtracted from the series of input signals in order to cancel intersymbol interference and generate a series of decision variables which are input to the corresponding slicer, each slicer further generating a series of error terms in relation to presence of noise in the channel as a difference between the corresponding series of decision variables and series of decisions, the improvement comprising:

a pair of attenuators, each associated with a different one of the decision feedback equalizers and applying an attenuation gain of less than one to the associated feedback filter when a mismatch occurs between the series of decisions output by the decision feedback equalizers.

2. The improvement of claim 1, wherein each of the pair of attenuators applies a gain of one to the associated feedback filter when the series of decisions output by the decision feedback equalizers match.

3. The improvement of claim 1, wherein each attenuator is connected to receive the series of decisions from the associated slicer.

4. The improvement of claim 1, wherein the selected threshold applied by a selected one of the slicers is a value $\alpha$, the selected threshold applied by a remaining one of the slicers is a value $-\alpha$, wherein a range $-\alpha$ to $\alpha$ forms an erasure zone, and wherein the mismatch between the series of decisions output by the decision feedback equalizers is detected when a selected decision variable from the series of decision variables falls within the erasure zone.

5. An improved dual decision feedback equalizer which applies a selective attenuation to improve error rate performance, comprising:

a first decision feedback equalizer operably coupled to receive a series of input signals $z_k$ and comprising:

a first slicer which utilizes a selected threshold $-\alpha$ to generate a series of decisions $â^1_k$ nominally indicative of corresponding peak data values of the series of input signals $z_k$;

a first feedback filter, operably coupled to receive the series of decisions $â^1_k$ from the first slicer, which provides a filtered output $(a^*p)^1_k$ based on previous decisions; and a first summing junction, operably coupled to receive and sum the filtered output $(a^*p)^1_k$ from the first feedback filter and the series of input signals $z_k$ to generate a series of decision variables $ã^1_k$ which are input to the first slicer;

a second decision feedback equalizer operably coupled in parallel with the first decision feedback equalizer to receive the series of input signals $z_k$ and comprising:

a second slicer which utilizes a selected threshold $\alpha$ to generate a series of decisions $â^2_k$ nominally indicative of corresponding peak data values of the series of input signals $z_k$;

a second feedback filter, operably coupled to receive the series of decisions $\hat{a}^2_k$ from the second slicer, which provides a filtered output $(a*p)^2_k$ based on previous decisions; and a second summing junction, operably coupled to receive and sum the filtered output $(a*p)^2_k$ from the second feedback filter and the series of input signals $z_k$ to generate a series of decision variables $\tilde{a}^2_k$ which are input to the second slicer; and first and second attenuators, operably coupled to the first and second slicers, respectively, which apply the selective attenuation to the first and second feedback filters, respectively, when a mismatch is detected between the series of decisions $\hat{a}^1_k$ and $\hat{a}^2_k$.

6. The improved dual decision feedback equalizer of claim 5, wherein the selective attenuation applied by the first and second attenuators comprise gain values less than one.

7. The improved dual decision feedback equalizer of claim 5, wherein the first and second attenuators each applies a gain value of one when no mismatch is detected between the series of decisions $\hat{a}^1_k$ and $\hat{a}^2_k$.

8. The improved dual decision feedback equalizer of claim 5, wherein the first and second slicers further output a series of error terms $e^1_k$ and $e^2_k$, respectively, in relation to differences between the series of decisions $\hat{a}^1_k$ and the series of decision variables $\tilde{a}^1_k$, and in relation to differences between the series of decisions $\hat{a}^2_k$ and the series of decision variables $\tilde{a}^2_k$, respectively.

9. The improved dual decision feedback equalizer of claim 8, further comprising:

first and second multi-stage buffers, operably coupled to receive the series of decisions $\hat{a}^1_k$ and $\hat{a}^2_k$, respectively;

first and second squaring blocks, operably coupled to receive and square the series of error terms $e^1_k$ and $e^2_k$, respectively;

a third summing junction, operably coupled to receive and sum the squared series of error terms $e^1_k$ and $e^2_k$, respectively;

an accumulator, operably coupled to receive a summed output of the third summing junction to generate an accumulated error energy; and a switch, operably coupled to the first and second multi-stage buffers and the accumulator, which selects a correct series of decisions from the series of decisions $\hat{a}^1_k$ and $\hat{a}^2_k$ stored in the first and second multi-stage buffers, respectively, in relation to a polarity of the accumulated error energy at such time that the mismatch between the series of decisions $\hat{a}^1_k$ and $\hat{a}^2_k$ is resolved.

10. A method for decoding a series of transmitted signals $z_k$, comprising steps of:

(a) utilizing a dual decision feedback equalizer to independently generate two series of decisions $\hat{a}^1_k$ and $\hat{a}^2_k$ in relation to peak magnitudes of the series of transmitted signals $z_k$, including steps of:

(a1) filtering the series of decisions $\hat{a}^1_k$ and $\hat{a}^2_k$ to generate filtered outputs $(a*p)^1_k$ and $(a*p)^2_k$ based on previous decisions; and (a2) summing the filtered outputs $(a*p)^1_k$ and $(a*p)^2_k$ with the transmitted input series zk to generate two series of decision variables $\tilde{a}^1_k$ and ã2k, to remove effects of intersymbol interference; and (b) applying an attenuation gain of less than one to the filtered outputs $(a*p)^1_k$ and $(a*p)^2_k$ when a mismatch is detected between the series of decisions $\hat{a}^1_k$ and $\hat{a}^2_k$.

11. The method of claim 10, further comprising a step of:

(c) applying an attenuation gain of one to the filtered outputs $(a*p)^1_k$ and $(a*p)^2_k$ when the mismatch between the series of decisions $\hat{a}^1_k$ and $\hat{a}^2_k$.

* * * * *